United States Patent
Lee

(10) Patent No.: US 12,525,079 B2
(45) Date of Patent: Jan. 13, 2026

(54) WAKE-UP CONTROL APPARATUS AND METHOD FOR VEHICLE

(71) Applicant: HYUNDAI MOBIS CO., LTD., Seoul (KR)

(72) Inventor: Tae Hee Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 49 days.

(21) Appl. No.: 18/353,990

(22) Filed: Jul. 18, 2023

(65) Prior Publication Data
US 2024/0153325 A1   May 9, 2024

(30) Foreign Application Priority Data
Nov. 9, 2022   (KR) .................. 10-2022-0148711

(51) Int. Cl.
*G07C 9/00* (2020.01)

(52) U.S. Cl.
CPC ............ *G07C 9/00309* (2013.01); *G07C 2009/00365* (2013.01)

(58) Field of Classification Search
CPC ..... G07C 9/00309; G07C 2009/00365; H04W 52/02; H04W 4/80; B60R 16/02; B60R 16/0231; B60R 16/023; B60R 16/033; B62D 15/00
See application file for complete search history.

(56) References Cited

U.S. PATENT DOCUMENTS

| | | | | |
|---|---|---|---|---|
| 2002/0022912 | A1* | 2/2002 | Urabe | B62D 6/10 701/41 |
| 2006/0149447 | A1* | 7/2006 | Williston | B62D 7/159 701/41 |
| 2015/0353033 | A1* | 12/2015 | Pribisic | H03K 17/962 307/115 |
| 2017/0158168 | A1* | 6/2017 | Nantz | B60R 25/24 |
| 2017/0352215 | A1* | 12/2017 | Maiwand | G07C 9/00309 |
| 2019/0248331 | A1* | 8/2019 | Salah | G01S 5/0284 |
| 2024/0011336 | A1* | 1/2024 | Gudapati | E05B 81/56 |

FOREIGN PATENT DOCUMENTS

JP   2005029001 A  *  2/2005
KR   10-2419491 B1     7/2022

* cited by examiner

*Primary Examiner* — Rufus C Point
(74) *Attorney, Agent, or Firm* — NovoTechIP International PLLC

(57) ABSTRACT

The present disclosure relates to a wake-up control apparatus and method for a vehicle. In response to a signal from a remote controller, power is supplied to some apparatuses selected from a plurality of apparatuses as an activation target, and the activation target performs an initialization operation through the supplied power, so that enough preliminary initialization time may be secured to completely perform the initialization operation on the activation target before an ignition of the vehicle is turned on, some of the plurality of apparatuses may be selectively and partially driven to reduce battery power consumption, and when the ignition of the vehicle is turned on, the vehicle may be driven immediately without waiting, which makes it possible to improve user convenience.

18 Claims, 6 Drawing Sheets

WAKE-UP CONTROL APPARATUS AND METHOD FOR VEHICLE

CROSS-REFERENCE TO RELATED APPLICATIONS

This application claims priority from and the benefit of Korean Patent Application No. 10-2022-0148711, filed on Nov. 9, 2022, which is hereby incorporated by reference for all purposes as if set forth herein.

TECHNICAL FIELD

Exemplary embodiments of the present disclosure relate to a wake-up control apparatus and method for a vehicle, and more particularly, to a wake-up control apparatus and method for a vehicle in which some selected apparatuses operate in response to a wake-up signal being received, and selected functions are initialized before a vehicle starts up.

BACKGROUND

A vehicle stops operation of a plurality of apparatuses provided therein while the ignition of the vehicle is turned off. While the ignition of the vehicle is turned off, the vehicle applies a wake-up signal having a high value for a predetermined period of time to operate the plurality of apparatuses therein.

As the plurality of apparatuses start to operate in response to operating power and a control signal applied by the vehicle according to the wake-up signal, the vehicle operates as a processor similar to an ignition key input.

Among the plurality of apparatuses, an electric power steering apparatus (MDPS) starts an initialization operation when power is supplied after the ignition of the vehicle is turned on, and operates normally after the initialization operation is completely performed. The electric power steering apparatus (MDPS) starts the initialization operation when the plurality of apparatuses in the vehicle start to operate according to the wake-up signal.

The electric power steering apparatus (MDPS) blocks interference by external manipulation and limits the operation while performing the initialization operation.

During the initialization operation, the electric power steering apparatus (MDPS) aligns a steering wheel, checks the state of each internal part to perform a calibration operation, and checks whether or not an abnormality has occurred according to the state of each part.

The related art of the present disclosure is disclosed in Korean Patent No. 10-1610406 (registered on Apr. 1, 2016 and entitled "STEERING WHEEL ALIGNMENT METHOD IN THE MDPS system").

When the initialization operation of the electric power steering apparatus (MDPS) is completely performed, the vehicle may start to be driven.

However, since the initialization operation of the electric power steering apparatus (MDPS) is performed for several seconds, the steering apparatus does not operate immediately after the ignition of the vehicle is turned on and the operation is limited, and thus a driver may feel uncomfortable.

Therefore, there is a need for a method of selectively operating some of the plurality of apparatuses by using the wake-up signal before the ignition of the vehicle is turned on.

SUMMARY

Various embodiments are directed to a wake-up control apparatus and method for a vehicle in which power is supplied to some apparatuses selected as an activation target among a plurality of apparatuses in response to a signal from a remote controller, and the activation target performs an initialization operation through the supplied power.

In an embodiment, a wake-up control apparatus for a vehicle includes: a first communication unit configured to receive a wake-up signal; a second communication unit configured to wait when an ignition of the vehicle is turned off, receive any one of the wake-up signal and a start signal, and apply the received signal to the first communication unit; and a processor configured to be driven by operating power supplied in response to the wake-up signal from the first communication unit, set at least one of a plurality of apparatuses provided in the vehicle as an activation target, and control the activation target to perform an initialization operation.

The second communication unit receives the wake-up signal from any one remote controller of a smart key and a portable terminal.

The processor controls a power management unit so that power of a battery is supplied to the activation target, and applies a control signal to the activation target through the first communication unit so that the activation target starts to operate.

The processor operates by receiving the operating power from a battery by a switch operating in response to the wake-up signal.

The processor sets an apparatus requiring the initialization operation as the activation target.

The processor sets a steering apparatus (MDPS) of the vehicle as the activation target so that the steering apparatus completely performs the initialization operation before the ignition of the vehicle is turned on.

The steering apparatus performs the initialization operation by sequentially performing sensor initialization, sensor calibration, voltage measurement, and failure detection in response to a control signal of the processor.

The first communication unit supports a selective wake-up function.

In an embodiment, a wake-up control method for a vehicle includes: waiting, by a second communication unit, and receiving a wake-up signal while an ignition of the vehicle is turned off; receiving, by a first communication unit, the wake-up signal from the second communication unit; applying operating power to a processor from a battery unit in response to the wake-up signal; setting, by the processor, at least one of a plurality of apparatuses provided in the vehicle as an activation target; and controlling, by the processor, the activation target to perform an initialization operation.

The second communication unit receives the wake-up signal from any one remote controller of a smart key and a portable terminal.

The applying of the operating power to the processor includes receiving the operating power from the battery by a switch operating in response to the wake-up signal.

The setting of at least one of the plurality of apparatuses as the activation target includes setting, by the processor, an apparatus requiring the initialization operation as the activation target.

The setting of at least one of the plurality of apparatuses as the activation target includes setting, by the processor, a steering apparatus (MDPS) of the vehicle as the activation target, and allowing the steering apparatus to completely perform the initialization operation while the ignition is off before the ignition of the vehicle is turned on.

The controlling of the activation target to perform the initialization operation includes: controlling, by the processor, a power management unit, and supplying, by the processor, power of the battery to the activation target; and applying a control signal to the activation target through the first communication unit, and controlling the activation target to perform the initialization operation.

The activation target performs the initialization operation by sequentially performing sensor initialization, sensor calibration, voltage measurement, and failure detection in response to the control signal of the processor.

According to one aspect, a wake-up control device and method for a vehicle of the present disclosure can completely perform an initialization operation on an activation target by using a wake-up signal before the ignition of the vehicle is turned on. When the ignition of the vehicle is turned on, the vehicle may be driven immediately without standby, which has the effect of improving user convenience.

According to one aspect of the present disclosure, time necessary for an initialization operation can be secured using a wake-up signal, and a plurality of apparatuses in a vehicle can be selectively and partially driven, which makes it possible to reduce power consumption of a battery and effectively manage the battery.

DETAILED DESCRIPTION

Figure 1:
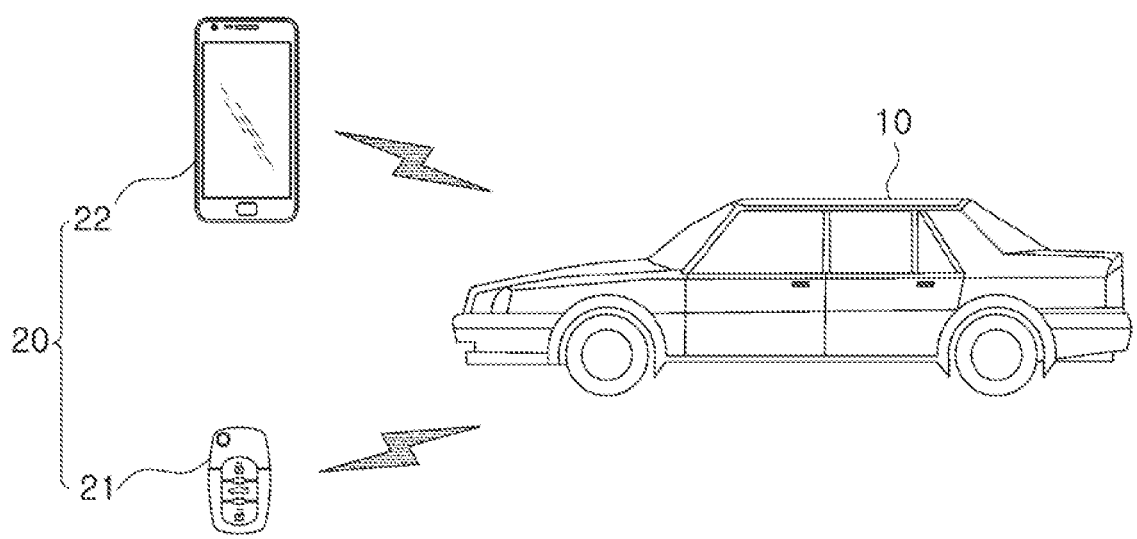
FIG. 1 is a diagram illustrating configurations of a vehicle equipped with a wake-up control apparatus and a remote controller according to an embodiment of the present disclosure.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random-access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, embodiments that include other components in addition to the components described in the various embodiments are also included in the scope of the present disclosure.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "linked," "coupled," or "connected" to another component, it is understood that not only a direct connection relationship but also an indirect connection relationship through an intermediate component may also be included. In addition, when a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, exemplary embodiments that include other components in addition to the components described in the various embodiments are also included in the scope of the present disclosure.

Hereinafter, a wake-up control apparatus and method for a vehicle will be described in detail with reference to the accompanying drawings through various exemplary embodiments.

FIG. 1 is a diagram illustrating configurations of a vehicle 10 equipped with a wake-up control apparatus and a remote controller 20 according to an embodiment of the present disclosure.

As illustrated in FIG. 1, the vehicle 10 may be unlocked or turned on/off through the remote controller 20 such as a portable terminal 22 or a smart key 21.

The portable terminal 22 may be at least one of a smart phone, a PDA, a tablet PC, and a laptop. An application or program for controlling the vehicle 10 is installed in the portable terminal 22, and the portable terminal 22 includes a communication module capable of communicating with the vehicle 10 in a wireless communication method.

The smart key 21 may transmit at least one of a lock signal, an unlock signal, a start signal, a start off signal, and a door open signal to the vehicle 10. The smart key 21 may transmit a separate wake-up signal to the vehicle 10. In addition, when the smart key 21 approaches the vehicle 10 at a certain distance, the smart key 21 may communicate with the vehicle 10, and unlock a door of the vehicle 10.

The wake-up control apparatus is provided in the vehicle 10.

The wake-up control apparatus may selectively operate some apparatuses among a plurality of apparatuses in the vehicle according to a signal received from the remote controller 20.

When a signal is received from the external remote controller 20, the wake-up control apparatus selects an activation target, transmits the wake-up signal, and controls a power management unit to apply battery power to the activation target.

Accordingly, some apparatuses, which are set as the activation target among the plurality of apparatuses provided in the vehicle 10, start to operate. When an ignition key is inputted, an ignition of the vehicle 10 may be turned on, and the vehicle 10 may start to be driven.

The wake-up control apparatus may control the operation by designating an apparatus requiring an initialization operation among the plurality of apparatuses in the vehicle 10 as the activation target.

Figure 2:
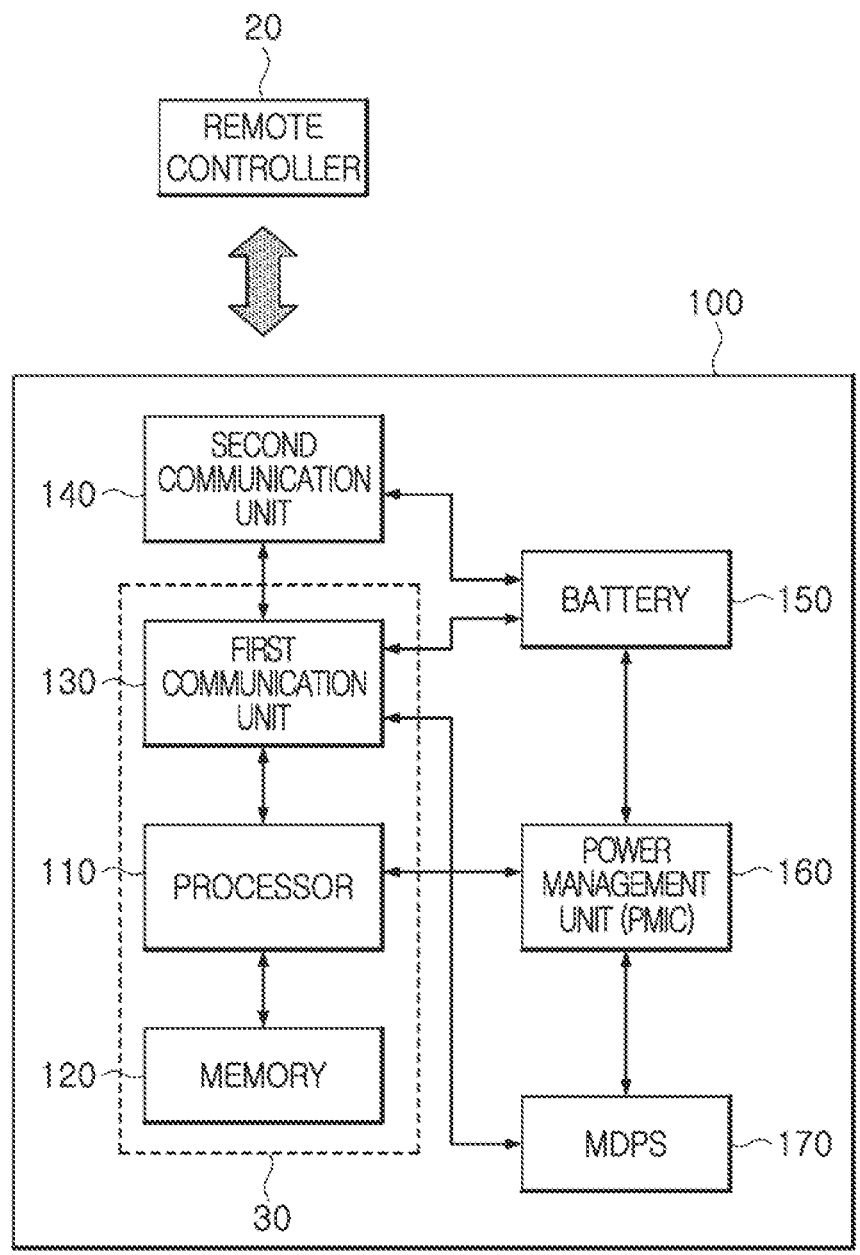
FIG. 2 is a block diagram briefly illustrating control configurations of a vehicle and a wake-up control apparatus according to an embodiment of the present disclosure.

FIG. 2 is a block diagram briefly illustrating control configurations of a vehicle 10 and a wake-up control apparatus 100 according to an embodiment of the present disclosure.

As illustrated in FIG. 2, the wake-up control apparatus 100 includes a first communication unit 130, a second communication unit 140, a memory 120, and a processor 110.

The wake-up control apparatus 100 controls a battery 150, a power management unit (PMIC) 160, and a steering apparatus (MDPS) 170 of the vehicle 10. In addition, the wake-up control apparatus 100 may be connected to a plurality of apparatuses in the vehicle 10, and control their operations.

The second communication unit 140 receives a signal transmitted from a remote controller 20.

The second communication unit 140 operates based on standby power while an ignition of the vehicle 10 is turned off, and receives the signal from the remote controller 20.

The second communication unit 140 applies the signal received from the remote controller 20 to the first communication unit 130.

The first communication unit 130 applies a wake-up signal received from the remote controller 20 through the second communication unit 140 to the processor 110.

The first communication unit 130 including a controller area network (CAN) communication driver or a local interconnect network (LIN) communication driver transmits and receives data.

In addition, the first communication unit 130 including a wired or wireless communication module may communicate with a portable terminal. For example, the first communication unit 130 includes at least one of short-distance communication such as Ethernet, Wi-Fi, and Bluetooth, mobile communication, and serial communication.

When the processor 110 is in an inactive state, the first communication unit 130 applies a signal to activate the processor 110 so that operating power is supplied from the battery 150 to the processor 110.

In this case, the wake-up control apparatus 100 may further include a switch (not illustrated) that sets the operation power of the battery 150 to be supplied to the processor 110. Depending on whether the wake-up signal is received from the second communication unit 140, the switch operates, and the battery power is supplied to the processor 110.

The processor 110 starts to operate according to the operating power applied from the battery 150, and controls some of the plurality of apparatuses in the vehicle 10 to be activated.

The processor 110 sets an activation target in response to the wake-up signal, and transmits the wake-up signal to the activation target through the first communication unit 130.

The processor 110 may transmit the wake-up signal on the basis of a list which is predetermined and stored in the memory 120. In addition, the processor 110 may set an apparatus requiring an initialization operation as the activation target.

Furthermore, the processor 110 may apply a control command for initialization to the activation target.

The processor 110 applies a signal to the power management unit (PMIC) 160 so that the power of the battery 150 is supplied to the activation target.

The processor 110 is composed of at least one microprocessor, and may be an electric control unit (ECU), a vehicle control unit (VCU), and a motor control unit (MCU).

The processor 110 operates according to a wake-up algorithm stored in the memory 120.

The memory 120 stores data for the activation target, a selection condition for the activation target, setting data according to the activation target, and transmission/reception data therein. The memory 120 includes storage means, for example, non-volatile memory such as random access memory (RAM), ROM, and electrically erased programmable rom (EEPROM), and flash memory.

The power management unit (PMIC) 160 allows the power of the battery 150 to be supplied to the activation target, in response to the signal received from the processor 110.

The power management unit (PMIC) 160 determines whether the power applied from the battery 150 is supplied to the activation target, by operating an internal or external relay.

The battery 150 supplies the operating power to each of the apparatuses. The battery 150 supplies the power to a specific apparatus according to the signal of the power management unit (PMIC) 160.

The steering apparatus (MDPS) 170 is one of the apparatuses activated by the processor 110 before the ignition of the vehicle 10 is turned on. The steering apparatus (MDPS) 170 performs the initialization operation as being activated before the ignition of the vehicle 10 is turned on.

The steering apparatus (MDPS) 170 starts to operate when the power of the battery 150 is supplied by the power management unit (PMIC) 160. The steering apparatus (MDPS) 170 includes a plurality of sensors (not illustrated) including a steering angle sensor and a torque sensor, an MDPS motor (not illustrated), and a motor driver (not illustrated).

The steering apparatus (MDPS) 170 performs the initialization operation according to the wake-up signal. During the initialization operation, the steering apparatus (MDPS) 170 initializes the plurality of sensors in relation to a function for assisting steering, checks whether signal values of the sensors are normal, and then performs a calibration operation.

In addition, the steering apparatus (MDPS) 170 checks whether failure has occurred in a circuit function of an ECU of the steering apparatus. For example, the steering apparatus (MDPS) 170 may compare a voltage measured in each circuit with a predetermined value, and determine whether the failure has occurred.

Figure 3:
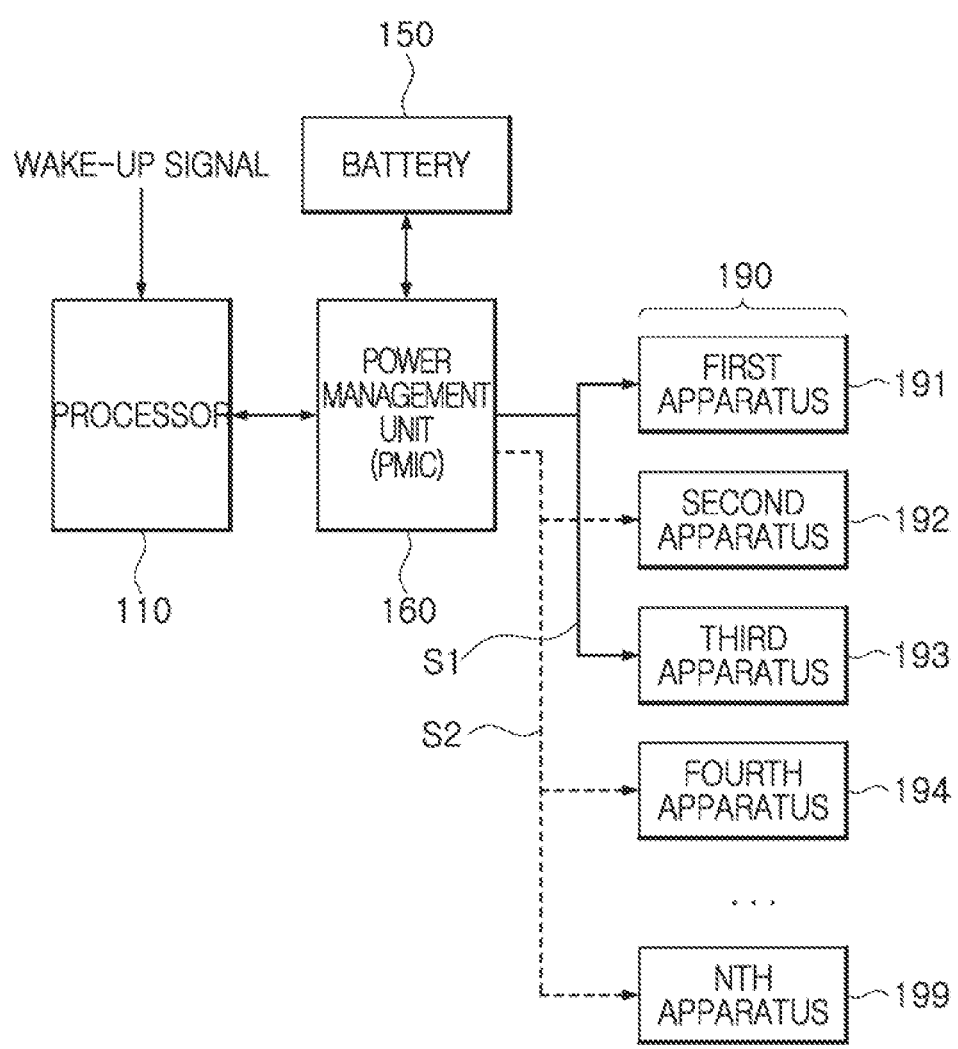
FIG. 3 is a reference diagram for explaining partial operations of a system according to a wake-up signal of a wake-up control apparatus for a vehicle according to an embodiment of the present disclosure.

FIG. 3 is a reference diagram for explaining partial operations of a system according to the wake-up signal of the wake-up control apparatus 100 for the vehicle 10 according to an embodiment of the present disclosure.

As illustrated in FIG. 3, in the wake-up control apparatus 100, the processor 110 receiving the wake-up signal selects an activation target from among a plurality of apparatuses 190, applies a signal to the power management unit (PMIC) 160 and the first communication unit 130, and allows the activation target to operate before the ignition of the vehicle 10 is turned on.

The activation target starts to operate based on the wake-up signal of the processor 110 and the supplied battery power.

The activation target is set to at least one of the plurality of apparatuses 190 provided in the vehicle and each performing a specific function. For example, the plurality of apparatuses 190 may include a steering apparatus, a brake system, an audio system, a navigation system, an obstacle sensing system, and an around view system. A first apparatus 191 may be the steering apparatus.

The processor 110 transmits the wake-up signal to the activation target through the first communication unit 130, and applies the signal to the power management unit (PMIC) 160. Accordingly, the power management unit (PMIC) 160 supplies the operating power of the battery 150 to each apparatus selected as the activation target.

For example, when the first apparatus 191 and a third apparatus 193 are set as the activation targets, the processor 110 applies a control signal to the power management unit (PMIC) 160, and the power of the battery 150 is supplied to the first apparatus 191 and the third apparatus 193.

Each of the first apparatus 191 and the third apparatus 193 performs the initialization operation according to settings.

Meanwhile, a second apparatus 192 and fourth to nth apparatus 194 to 199 do not operate and each remain in a sleep state.

When an ignition key is inputted, a start command is applied to the power management unit (PMIC) 160 to turn on the ignition of the vehicle 10, and all the apparatuses 190 are supplied with the power of the battery 150 and start to operate.

Since the initialization operation of the first and third apparatuses 191 and 193 is completely performed, the first and third apparatuses 191 and 193 immediately start to operate.

When a steering apparatus 170 is activated by the wake-up signal, and the initialization operation is completely performed before the ignition of the vehicle 10 is turned on, the steering apparatus 170 may control a steering of the vehicle 10 immediately after the ignition of the vehicle 10 is turned on.

Accordingly, the processor 110 selectively activates an apparatus that requires the initialization operation when the ignition of the vehicle 10 is turned on so that the initialization operation is completely performed before the ignition of the vehicle 10 is turned on, and consequently, the vehicle 10 may be driven without waiting.

Figure 4:
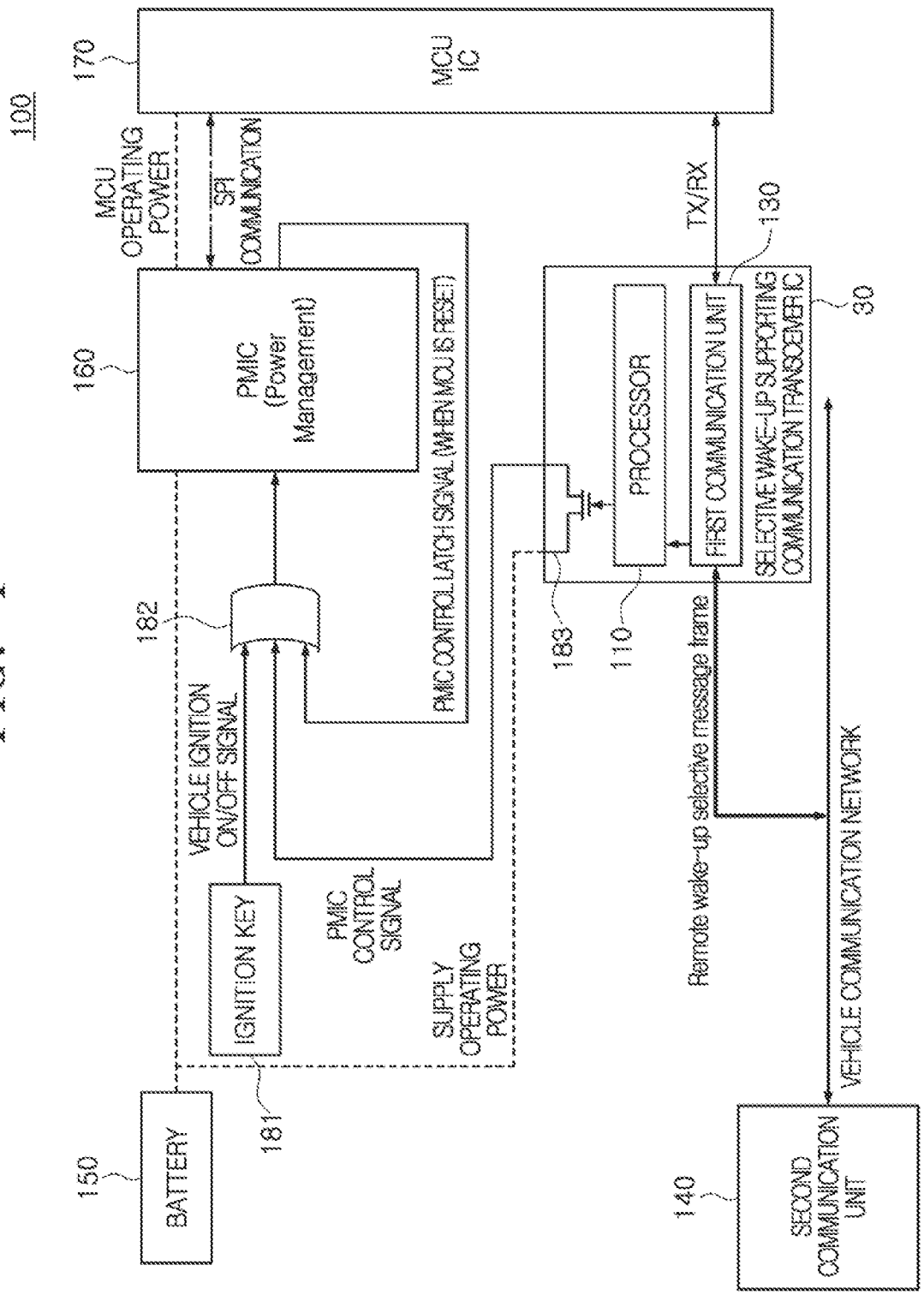
FIG. 4 is a diagram illustrating a signal flow according to a wake-up signal of a wake-up control apparatus for a vehicle according to an embodiment of the present disclosure.

FIG. 4 is a diagram illustrating a signal flow according to the wake-up signal of the wake-up control apparatus 100 for the vehicle 10 according to an embodiment of the present disclosure.

As illustrated in FIG. 4, in the wake-up control apparatus 100, the second communication unit 140 waiting for operation receives a signal from the remote controller 20, and applies the signal to the first communication unit 130 while the ignition of the vehicle 10 is turned off.

The first communication unit 130 is included in a selective wake-up communication transceiver IC 30, and transmits the signal so that some of the plurality of apparatuses are selectively activated.

When the first communication unit 130 receives the signal from the second communication unit 140, the power of the battery 150 is supplied by operation of a switch 183, and the processor 110 operates.

The processor 110 sets an activation target according to a selective wake-up function, and applies a control signal for the activation target to the power management unit (PMIC) 160. The processor 110 may set the steering apparatus (MDPS) 170 as the activation target.

The second switch 182 applies the signal to the power management unit (PMIC) 160 according to a signal of an ignition key 181 or the processor 110.

The power management unit (PMIC) 160 allows the power of the battery 150 to be applied to the steering apparatus (MDPS) 170, which is the first apparatus 191, according to the control signal of the processor 110.

The power management unit (PMIC) 160 allows the operating power of the battery 150 to be supplied to all the apparatuses when the ignition key 181 is inputted.

The power management unit (PMIC) 160 applies an activation signal to the steering apparatus (MDPS) 170 through SPI communication, and driving power is applied from the battery 150. Accordingly, the steering apparatus (MDPS) 170 is activated and starts to operate. After being activated, the steering apparatus (MDPS) 170 performs the initialization operation.

Meanwhile, the first communication unit 130 transmits and receives (TX/RX) the signal with the steering apparatus (MDPS) 170 in response to the control signal of the processor 110.

Figure 5:
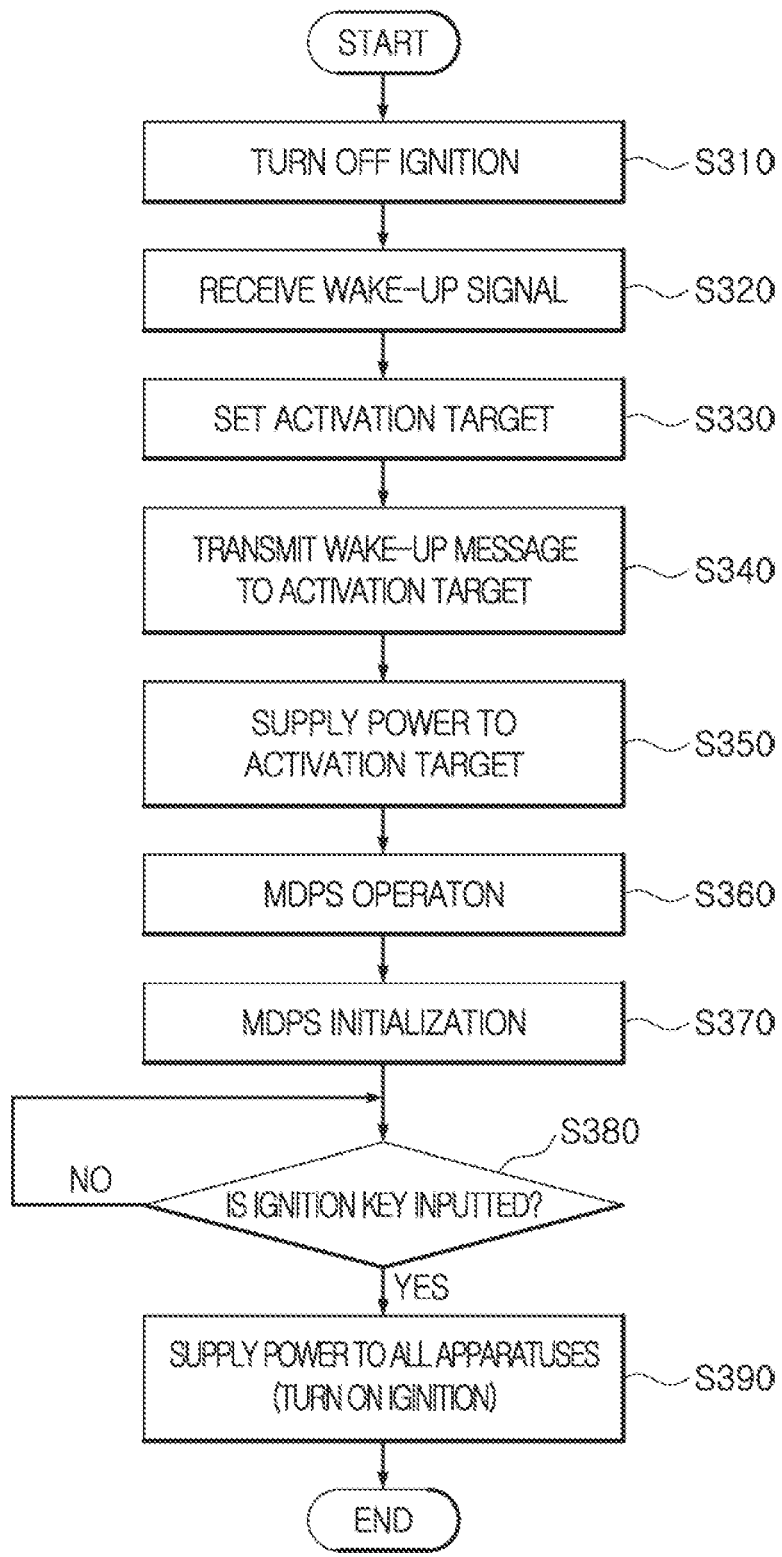
FIG. 5 is a flowchart illustrating a wake-up control method of a wake-up control apparatus for a vehicle according to an embodiment of the present disclosure.

FIG. 5 is a flowchart illustrating a wake-up control method of the wake-up control apparatus 100 for the vehicle 10 according to an embodiment of the present disclosure.

As illustrated in FIG. 5, in the wake-up control apparatus 100 the second communication unit 140 waits to receive the signal while the ignition of the vehicle 10 is turned off in step S310.

In step S320, the second communication unit 140 receives the wake-up signal from any one of the smart key 21 and the portable terminal 22 of the remote controller 20. The portable terminal 22 may transmit the wake-up signal after the activation target is designated, in response to inputted setting.

The second communication unit 140 applies the signal to the first communication unit 130, and the first communication unit 130 operates the processor 110.

With the ignition of the vehicle 10 turned off, the processor 110 sets the activation target in step S330, and transmits the signal to the activation target through the first communication unit 130 in step S340. In addition, the processor 110 applies the control signal to the power management unit 160 so that the power is supplied to the activation target in step S350.

The power management unit 160 controls a relay provided inside or outside so that the power is supplied to the activation target.

The first apparatus 191, which is the activation target, receives the operating power from the battery 150, and receives the control signal from the processor 110 to perform a designated operation.

When the steering apparatus (MDPS) 170 is set as the activation target, the steering apparatus (MDPS) 170 starts to operate according to the applied operating power in step S360. The steering apparatus (MDPS) 170 performs the initialization operation in step S370.

When the ignition key is inputted in step S380, the power management unit 160 supplies the power of the battery 150 to all the apparatuses in response to the ignition key being inputted, and the ignition of the vehicle 10 is turned on in step S390.

Figure 6:
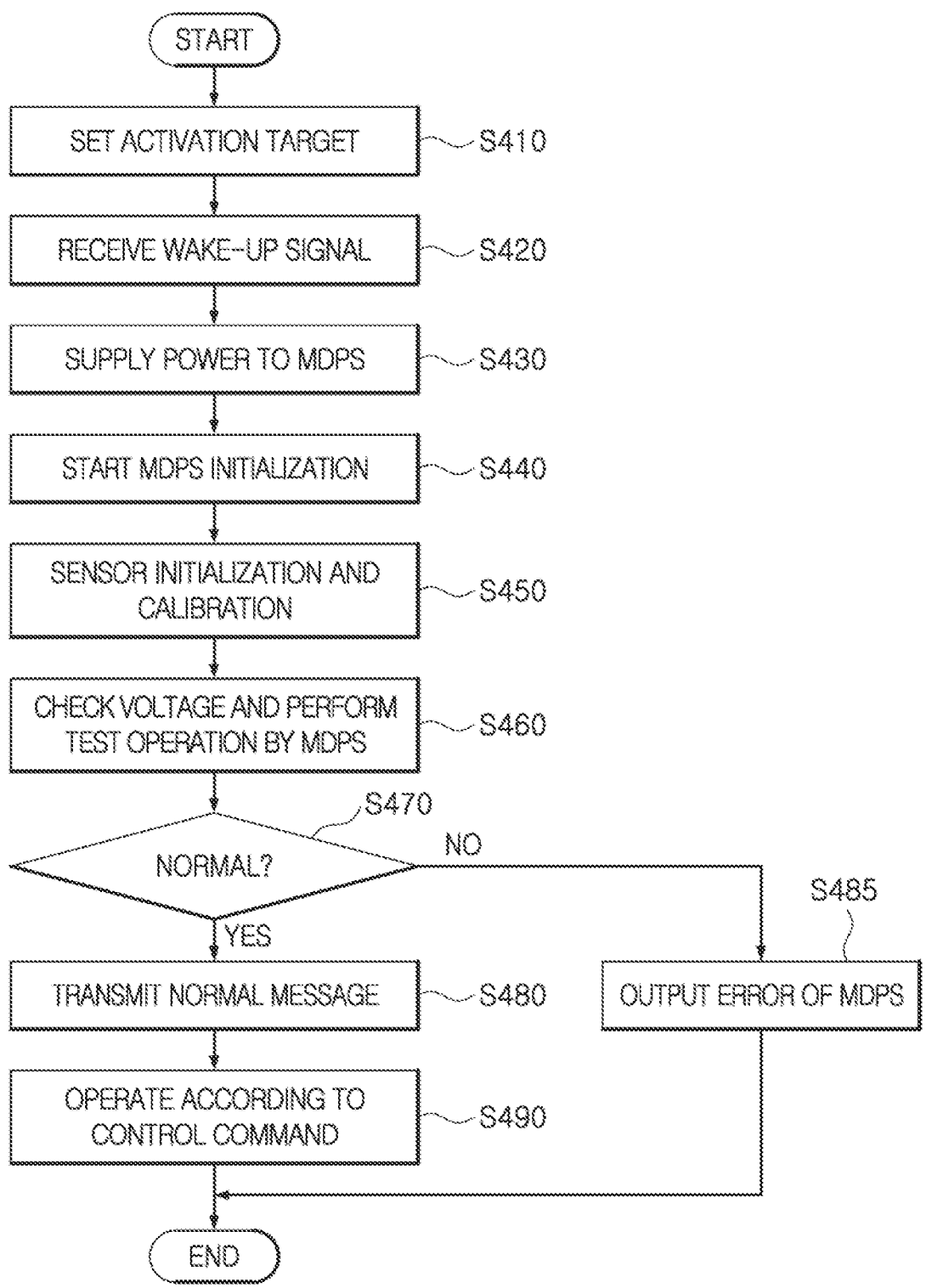
FIG. 6 is a flowchart illustrating a steering apparatus initialization method of a collision avoidance system for an autonomous vehicle according to an embodiment of the present disclosure.

FIG. 6 is a flowchart illustrating a steering apparatus initialization method of a collision avoidance system for an autonomous vehicle according to an embodiment of the present disclosure.

As illustrated in FIG. 6, the wake-up control apparatus 100 transmits the wake-up signal to an apparatus, which is the activation target, through the processor 110 in step S410.

The steering apparatus (MDPS) 170 receives the wake-up signal in step S420, and starts to operate when the power of the battery 150 is applied in step S430.

The steering apparatus (MDPS) 170 starts the initialization operation in step S440. In this case, the steering apparatus (MDPS) 170 is a controller of the electric power steering apparatus.

In step S450, the steering apparatus (MDPS) 170 initializes a plurality of sensors such as a steering angle sensor and a torque sensor, and performs the calibration operation on voltage values of the sensors.

In addition, the steering apparatus (MDPS) 170 checks a voltage for each of a configuration of its own circuit, a configuration of a motor driving unit, a configuration of a motor circuit, and performs a test operation to determine whether there is failure, in step S460.

The steering apparatus (MDPS) 170 determines whether or not it is normal, according to a result of the test operation in step S470. When the steering apparatus (MDPS) 170 determines that it is normal, the steering apparatus (MDPS) 170 generates a test normal message according to completion of the initialization operation in step S480, and applies the test normal message to the processor 110.

The steering apparatus (MDPS) 170 starts to operate according to a control command received from a main controller of the vehicle in step S490.

Meanwhile, when the failure is detected during the initialization operation, an error of the steering apparatus (MDPS) 170 is output in step S485.

Accordingly, a wake-up control apparatus and method for a vehicle according to an aspect of the present disclosure can activate an apparatus requiring an initialization operation by using a separate wake-up signal before an ignition of the vehicle is turned on, and perform an initialization operation before the ignition is turned on.

The present disclosure has been described above with reference to the embodiments illustrated in the accompanying drawings, but the embodiments are merely for illustrative purposes. A person having ordinary knowledge in the art to which the present disclosure pertains will understand that various modifications and other equivalent embodiments are possible from the embodiments. Accordingly, the true technical scope of the present disclosure should be defined by the following claims.

What is claimed is:

1. A wake-up control apparatus for a vehicle comprising a plurality of apparatuses, the wake-up control apparatus comprising:
   a first communication unit configured to receive a wake-up signal;
   a second communication unit configured to receive the wake-up signal or a start signal and, in response to receiving one of the wake-up signal and start signal while an ignition of the vehicle is turned off, apply the received signal to the first communication unit; and
   a processor configured to, in response to a control signal from the first communication unit, access data stored in memory to identify and set one of the plurality of apparatuses in the vehicle as an activation target, selectively provide power to the activation target, and control the activation target to perform an initialization operation to ready the activation target for operation prior to ignition of the vehicle;
   wherein:
   the plurality of apparatuses includes an electric power steering apparatus, and
   the processor is configured to set the electric power steering apparatus as an activation target so that the electric power steering apparatus performs the initialization operation before the ignition of the vehicle is turned on, the initialization operation comprising initializing a plurality of sensors comprising a steering angle sensor and a torque sensor, checking whether signal values of the sensors are normal and performing a calibration operation.

2. The wake-up control apparatus of claim 1, wherein the second communication unit receives the wake-up signal from one of a smart key and a portable terminal.

3. The wake-up control apparatus of claim 1, wherein the processor is configured to
   control a power management unit to supply power of a battery to the activation target; and
   apply a control signal to the activation target through the first communication unit to cause the activation target to start to operate and perform the initialization operation.

4. The wake-up control apparatus of claim 1, wherein the processor is configured to, in response to the wake-up signal, perform a switch operation to receive operating power supplied from a battery and operate with the received operating power.

5. The wake-up control apparatus of claim 1, wherein:
   the memory stores data indicating which of the plurality of apparatuses is a first apparatus requiring the initialization operation prior to regular operation, and
   the processor is configured to operate the first apparatus as the activation target based on the data in the memory.

6. The wake-up control apparatus of claim 1, wherein, for performing the initialization operation, the electric power steering apparatus is configured to compare a voltage measured in each of a plurality of circuits with a predetermined value and determined, based on this comparison, whether failure has occurred for failure detection.

7. The wake-up control apparatus of claim 1, wherein the first communication unit supports a selective wake-up function.

8. A method for waking up a vehicle including a processor, first and second communication units, and a plurality of apparatuses, the method comprising:
   receiving, at the second communication unit, a wake-up signal while an ignition of the vehicle is turned off;
   receiving, at the first communication unit, the wake-up signal from the second communication unit;
   in response to the first communication unit receiving the wake-up signal, applying operating power supplied from a battery to the processor;
   selectively providing power to a motor driven electric power steering apparatus (MDPS) as an activation target requiring an initialization operation prior to regular operation; and controlling the activation target to perform the initialization operation to ready the activation target for regular operation prior to ignition of the vehicle, the initialization operation comprising initializing a plurality of sensors comprising a steering angle sensor and a torque sensor, checking whether signal values of the sensors are normal and performing a calibration operation.

9. The method of claim 8, wherein receiving, at the second communication unit, the wake-up signal comprises receiving, at the second communication unit, the wake-up signal from one of a smart key and a portable terminal.

10. The method of claim 9, wherein applying the operating power to the processor comprises performing, in response to receiving the wake-up signal, a switching operation for receiving the operating power from the battery.

11. The method of claim 10, wherein controlling the activation target to perform the initialization operation comprises:
controlling a power management unit to supply power of the battery to the activation target; and
applying a control signal to the activation target through the first communication unit, and controlling the activation target to perform the initialization operation.

12. The method of claim 8, wherein:
a plurality of apparatuses requiring an initialization operation are identified in data stored in a memory accessible to the processor, and
the processor is programmed to set multiple apparatuses of the plurality of apparatuses as activation targets to perform an initialization operation prior to ignition of the vehicle.

13. The method of claim 9, further comprising, for the MDPS as the activation target performing:
checking a voltage for the MDPS as the activation target, and
testing operation of the MDPS before the ignition of the vehicle is turned on.

14. The method of claim 8, wherein controlling the activation target to perform the initialization operation comprises controlling the MDPS to perform sensor initialization and sensor calibration for sensors of the MDPS.

15. The wake-up control apparatus of claim 1, wherein the first communication unit, in response to receiving the wake-up signal, applies the control signal to activate the processor and initiate operating power being supplied from a battery to the processor.

16. The wake-up control apparatus of claim 1, further comprising a power management unit, the power management unit being controlled by the processor to route power from a battery to the activation target.

17. The wake-up control apparatus of claim 1, wherein the plurality of apparatuses comprises a brake system, an audio system, a navigation system, an obstacle sensing system, and an around view system.

18. The wake-up control apparatus of claim 17, wherein the activation target comprises two or more of the apparatuses in the plurality of apparatuses.

* * * * *